(12) United States Patent
Liang

(10) Patent No.: US 8,363,390 B2
(45) Date of Patent: Jan. 29, 2013

(54) SLIDER ELECTRONIC DEVICE

(75) Inventor: Jen-Yu Liang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 318 days.

(21) Appl. No.: 12/948,950

(22) Filed: Nov. 18, 2010

(65) Prior Publication Data

US 2012/0033355 A1 Feb. 9, 2012

(30) Foreign Application Priority Data

Aug. 3, 2010 (CN) ...................... 2010 2 0279724 U

(51) Int. Cl.
*G06F 1/16* (2006.01)
(52) U.S. Cl. ................ 361/679.01; 455/575.4; 312/326; 345/170
(58) Field of Classification Search ............... 455/575.8, 455/561.1, 561.2, 557, 575.3, 552.1, 575.4, 455/575.1, 566; 312/309, 223.1, 223.2, 216, 312/208.4, 244, 236; 361/679.01, 679.02, 361/679.3, 679.4, 679.22, 679.32, 679.33, 361/679.39, 679.04, 679.48, 679.46, 679.56, 361/679.59; 248/183.3, 685, 176.3; 345/167, 345/168, 169, 170, 171, 172, 173, 1.3
See application file for complete search history.

(56) References Cited

U.S. PATENT DOCUMENTS

| 7,197,346 | B2* | 3/2007 | Eromaki et al. ............ 455/575.8 |
| 2011/0156557 | A1* | 6/2011 | Wu et al. ....................... 312/309 |
| 2011/0176261 | A1* | 7/2011 | Wu et al. ................... 361/679.01 |

* cited by examiner

*Primary Examiner* — Hung Duong
(74) *Attorney, Agent, or Firm* — Altis Law Group, Inc.

(57) ABSTRACT

An slider electronic device includes a main body, a display body, two rotary members, and a resilient member. The main body includes a first end and a second end opposite to each other. The display body is movably mounted on the main body and includes a proximal end and a distal end opposite to each other. One end of each rotary member is rotatably connected to the main body, and the other end is rotatably connected to the display body. Two ends of the resilient member are connected to the second end of the main body the proximal end of the display body, respectively. When the display body covers the main body, the proximal end of the display body is adjacent to the first end of the main body, and the distal end of the display body is adjacent to the second end of the main body.

14 Claims, 4 Drawing Sheets

SLIDER ELECTRONIC DEVICE

BACKGROUND

1. Technical Field

The present disclosure generally relates to an electronic device, and more particularly to a slider electronic device.

2. Description of Related Art

A commonly used portable electronic device such as a slider mobile phone, generally includes a main body and a display body slidably positioned on the main body such that the display body of the slider mobile phone is capable of being moved to expose or cover the main body. However, the oblique angle between the main body and the display body is not adjustable which can cause inconvenience for observing or manipulating the slider electronic device when laid on a support surface Therefore, there is room for improvement within the art.

BRIEF DESCRIPTION OF THE DRAWINGS

The components in the drawings are not necessarily drawn to scale, the emphasis being placed upon clearly illustrating the principles of the present disclosure. Moreover, in the drawings, like reference numerals designate corresponding parts throughout several views, and all the views are schematic.

DETAILED DESCRIPTION

Figure 1:
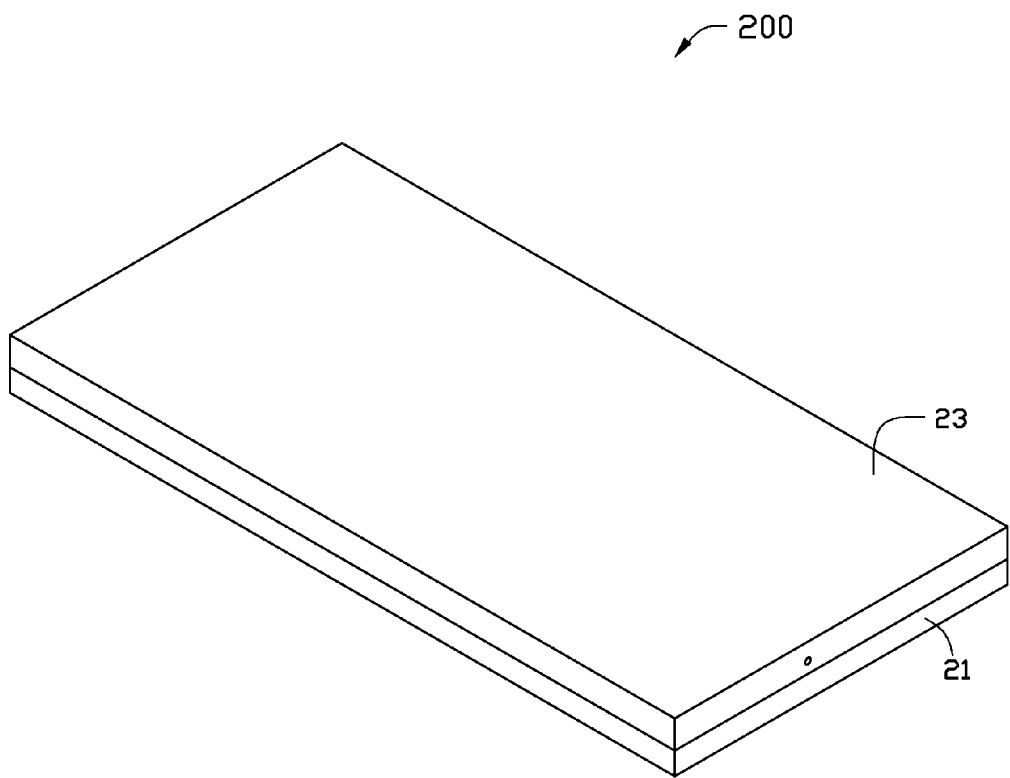
FIG. 1 is an assembled, isometric view of one embodiment of an slider electronic device, the slider electronic device including a main body and a display body.
Figure 2:
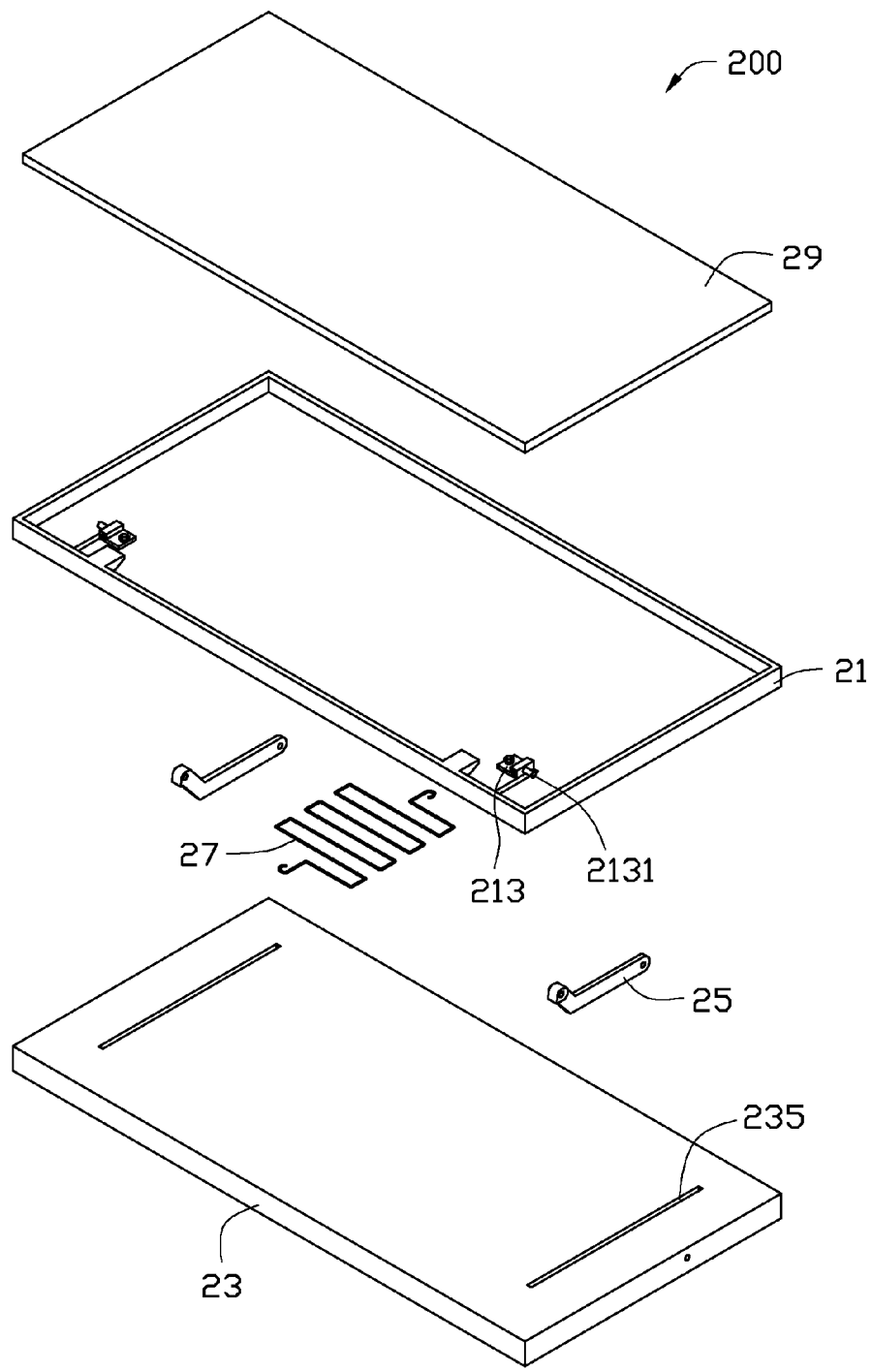
FIG. 2 is an exploded, isometric view of the slider electronic device of FIG. 1.
Figure 3:
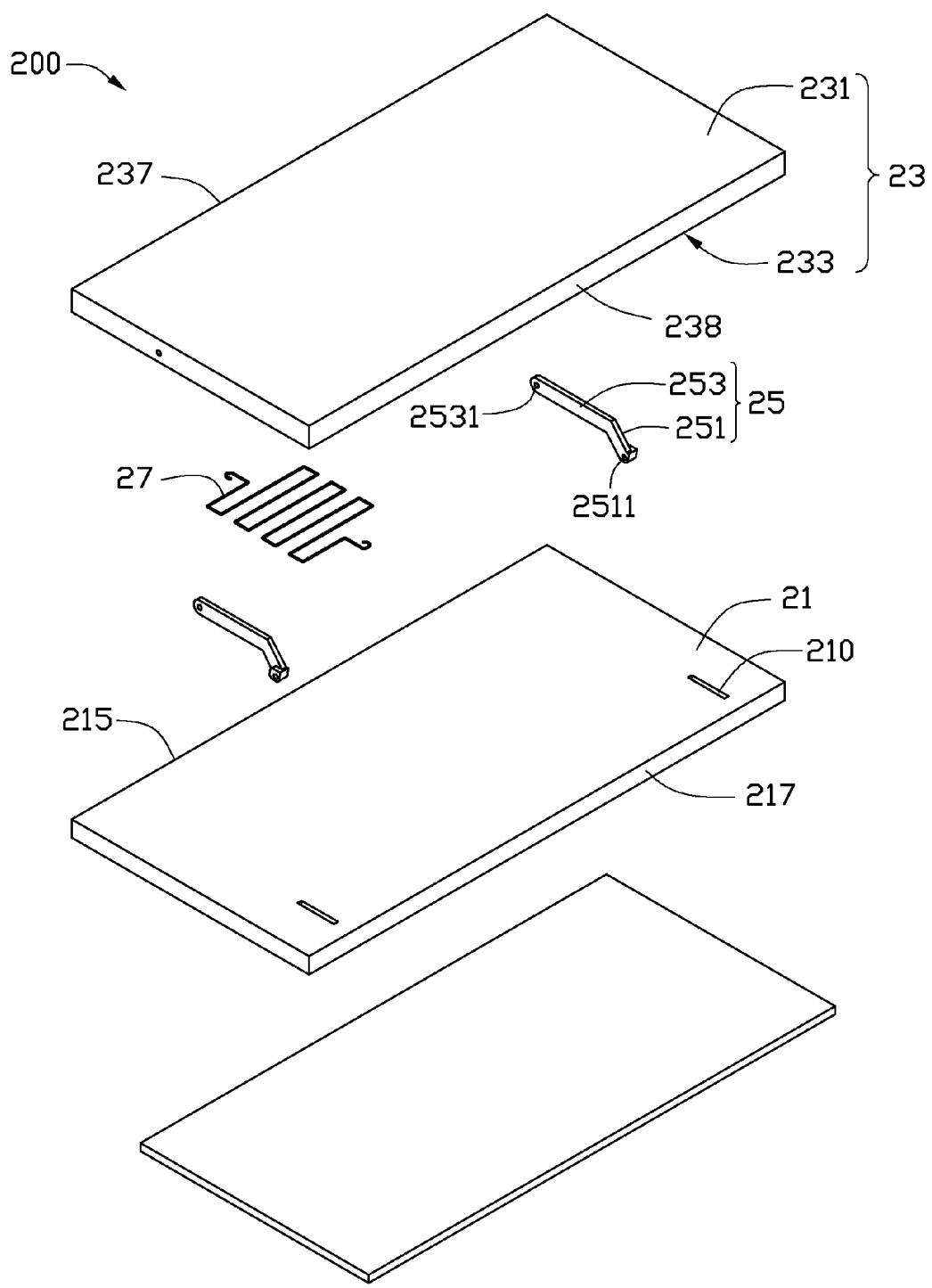
FIG. 3 is similar to FIG. 2, but viewed from another aspect.
Figure 4:
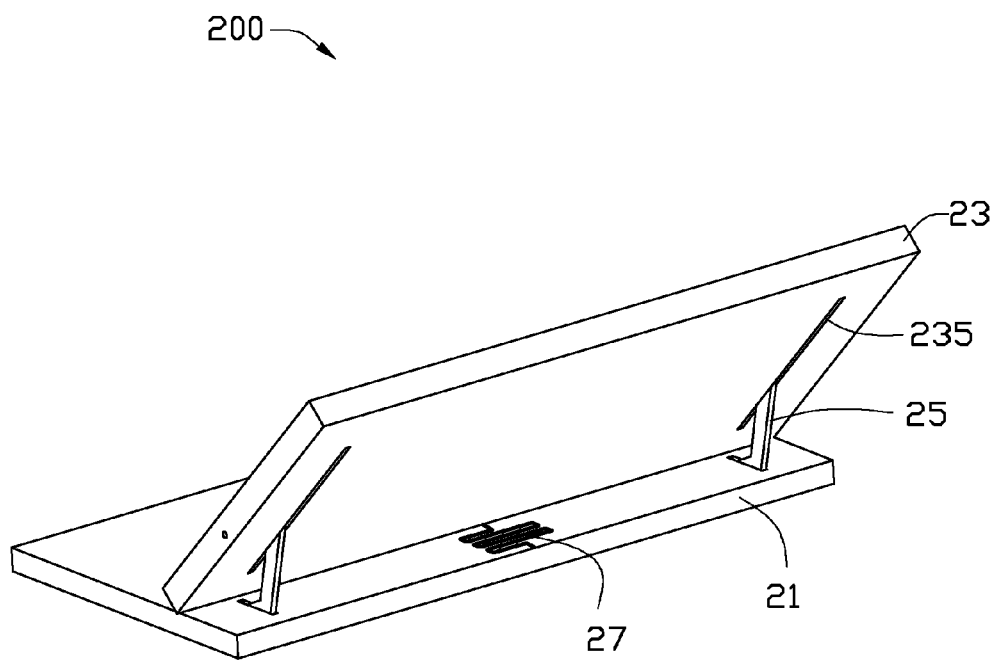
FIG. 4 is an assembled, isometric view of the slider electronic device of FIG. 1, showing the display body oblique relative to the main body.

Referring to FIGS. 1 through 3, an embodiment of a slider electronic device 200 includes a main body 21, a display body 23, two rotary members 25 rotatably connected to the main body 21 and the display body 23, a resilient member 27, and a sub-cover 29 covering the main body 21 to protect the main body 21. Alternatively, the slider electronic device 200 may include one or more than two rotary members 25 and multiple resilient members 27, and the sub-cover 29 may be omitted.

The main body 21 can be substantially rectangular, defines two rotating slots 210 adjacent to opposite ends thereof, and forms two fixing members 213 on one side of the main body 21 adjacent to the rotating slots 210, respectively. Each fixing member 213 forms a pivot shaft 2131 thereon. The main body 21 includes a first end 215 and a second end 217 opposite to the first end 215, and the rotating slots 210 are adjacent to the second end 217.

The display body 23 can be substantially rectangular and includes a first surface 231, a second surface 233 opposite to the first surface 231, and a screen (not shown) formed on the first surface 231. The display body 23 defines two receiving slots 235 substantially parallel to each other and adjacent to opposite ends of the display body 23. The receiving slots 235 are longer than the rotating slots 210 of the main body 21. The receiving slots 235 of the display body 23 correspond to the rotating slots 210 of the main body 21. The display body 23 further forms two pivot shafts (not shown) in the receiving slots 235 connected with the rotary members 25, respectively. The display body 23 includes a proximal end 237 and a distal end 238 opposite to the proximal end 237. Alternatively, the display body 23 may define one or more than two receiving slots 235 and the numbers of the rotating slots 210, the fixing members 231, and the rotary members 25 are altered correspondingly.

Each rotary member 25 can be a substantially angled bar with a first end (not labeled) and a second end (not labeled) and includes a rotating portion 251 and an extending portion 253 connected with the rotating portion 251. The rotating portion 251 defines a pivot hole 2511 at the first end of the rotary member 25, and the extending portion 253 defines a shaft hole 2531 at the second end of the rotary member 25.

Alternatively, the fixing members 213 may be omitted, whereby the pivot shafts 2131 are formed in the rotating slots 210. Furthermore, the main body 21 may define two pivot holes in opposite inner side surfaces of the rotating slots 210, and the display body 23 may define two shaft holes in opposite inner side surfaces of the receiving slots 235. Therefore, each rotary member 25 forms a pivot shaft at each end thereof.

In the illustrated embodiment, the resilient member 27 is an extension spring and includes multiple angled portions connected in order.

The shape of the sub-cover 29 corresponds to the main body 21, and in the illustrated embodiment, the sub-cover 29 is substantially rectangular. Alternatively, the main body 21 may be other shapes, such as a triangle or a polygon, with the shapes of the display body 23 and the sub-cover 29 altered correspondingly.

During assembly of the slider electronic device 200, the rotating portions 251 of the rotary members 25 pass through the rotating slots 210 of the main body 21 and rotatably connect to the pivot shafts 2131 of the fixing members 213. One end of the resilient member 27 is connected to the second end 217 of the main body 21, and the other end of the resilient member 27 is connected to the proximal end 219 of the display body 237. The extending portions 253 of the rotary members 25 are received in the receiving slots 235 and rotatably connected with the display body 23. The sub-cover 29 covers the main body 21.

In the slider electronic device 200, when the display body 23 covers the main body 21, the second surface 233 of the display body 23 faces the main body 21, the proximal end 237 of the display body 23 is adjacent to the first end 215 of the main body 21, and the distal end 238 of the display body 23 is adjacent to the second end 217 of the main body 21. The fixing members 213 are on a side of the main body 21 away from the display body 23, and the resilient member 27 is between the rotary members 25. When the display body 23 covers the main body 21, the resilient member 25 is stretched.

Because the resilient member 27 is stretched when the display body 23 is folded on the main body 21, when the external force is removed, the proximal end 237 of the display body 23 moves towards the second end 215 of main body 21 drawn by the resilient member 27. At the same time, the rotary members 25 are rotated to be substantially perpendicular to the main body 21, and therefore the display body 23 is maintained at a predetermined viewing angle relative to the main body 21. At this state, the display body 23 is oblique relative to the main body 21.

The slider electronic device 200 includes relatively few elements. Thus, the manufacturing cost is low, and the slider electronic device 200 occupies little space and is conveniently transportable or storable.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An slider electronic device, comprising:
a main body comprising a first end and a second end opposite to the first end;
a display body movably mounted on the main body and comprising a proximal end and a distal end opposite to the proximal end, wherein when the main body is folded on the display body, the first end of the main body is adjacent to the proximal end of the display body, and the second end of the main body is adjacent to the distal end of the display body;
at least one rotary member comprising a first end rotatably connected to the main body and a second end rotatably connected to the display body; and
at least one resilient member, wherein the one end of the at least resilient member is connected to the second end of the main body, and the other end of the at least one resilient member is connected to the proximal end of the main body.

2. The slider electronic device of claim 1, wherein the main body defines at least one rotating slot, and one end of the at least one rotary member is partially received in the at least one rotating slot.

3. The slider electronic device of claim 2, wherein the at least one rotary member is rotatably connected to the main body by an engagement of a pivot hole and a pivot shaft.

4. The slider electronic device of claim 3, wherein the pivot shaft is formed on the main body, and the at least one rotary member defines the pivot hole at the first end engaging with the pivot shaft.

5. The slider electronic device of claim 4, wherein the main body further comprises at least one fixing member on one side of the main body away from the display body, the pivot shaft is formed on the at least one fixing member, and the at least one rotary member passes through the at least one rotating slot and is connected to the at least one pivot shaft.

6. The slider electronic device of claim 2, wherein the display body defines at least one receiving slot corresponding to the at least one rotating slot of the main body, and the second end of the at least one rotary member is received in the at least one receiving slot.

7. The slider electronic device of claim 1, further comprising a sub-cover covering one side of the main body away from the display body.

8. An slider electronic device, comprising:
a main body comprising a first end and a second end opposite to the first end;
a display body movably mounted on the main body and comprising a proximal end and a distal end, wherein the proximal end of the display body and the second end of the main body is adjacent to each other when the display body is oblique relative to the main body;
at least one rotary member comprising a first end rotatably connected to the main body and a second end rotatably connected to the display body; and
at least one resilient member, wherein one end of the at least one resilient member is connected to the second end of the main body, and the other end of the at least one resilient member is connected to the proximal end of the display body and is away from the second end of the main body.

9. The slider electronic device of claim 8, wherein the main body defines at least one rotating slot, and one end of the at least one rotary member is received in the at least one rotating slot.

10. The slider electronic device of claim 9, wherein the at least one rotary member is rotatably connected to the main body by an engagement of a hole and a pivot shaft.

11. The slider electronic device of claim 10, wherein the pivot shaft is formed on the main body, and the at least one rotary member defines the pivot hole at the first end engaging with the pivot shaft.

12. The slider electronic device of claim 11, wherein the main body further comprises at least one fixing member on one side of the main body away from the display body, the pivot shaft is formed on the at least one fixing member, the at least one rotary member passes through the at least one rotating slot and is connected to the pivot shaft.

13. The slider electronic device of claim 9, wherein the display body defines at least one receiving slot corresponding to the at least one rotating slot of the main body, and the other end of the at least one rotary member is received in the at least one receiving slot.

14. The slider electronic device of claim 8, further comprising a sub-cover covering on one side of the main body away from the display body.

* * * * *